United States Patent

Lester et al.

[15] 3,679,704

[45] July 25, 1972

[54] PREPARATION OF DIBENZODIOXINS

[72] Inventors: George R. Lester, Park Ridge; John F. Brennan, Des Plaines, both of Ill.

[73] Assignee: Universal Oil Products Company, Des Plaines, Del.

[22] Filed: Aug. 7, 1969

[21] Appl. No.: 848,359

[52] U.S. Cl. ..................................................260/340.3
[51] Int. Cl. ..................................................C07d 15/20
[58] Field of Search..........................................260/340.3

[56] References Cited

OTHER PUBLICATIONS

Tomita, et al. " Chemical Abstracts," Vol. 49 (1955), Col. 10964a

Tomita, et al., " Chemical Abstracts," Vol. 49 (1955) Col. 10990c.

*Primary Examiner*—Alex Mazel
*Assistant Examiner*—James H. Turnipseed
*Attorney*—James R. Hoatson, Jr. and Raymond H. Nelson

[57] ABSTRACT

Dibenzodioxins are prepared by reacting phenol with a palladium halide in the presence of a catalyst comprising a copper halide, said reaction being effected in a sodium acetate-acetic acid medium at refluxing conditions.

10 Claims, No Drawings

PREPARATION OF DIBENZODIOXINS

This invention relates to a novel method for the preparation of dibenzodioxins. More specifically, the invention is concerned with a process for preparing dibenzodioxins by reacting phenols with a palladium halide in a catalytic manner utilizing catalysts of a type hereinafter set forth in greater detail.

The dibenzodioxins which are prepared accordingly to the process of this invention will find a wide variety of uses in the chemical field, the most important use being as an intermediate in the preparation of useful chemical compounds. For example, the dibenzodioxins may be used as intermediates in the preparation of pharmaceuticals or lubricants. A specific use would be the preparation of dibenzo-p-dioxin according to the method of this invention and thereafter halogenating the compound by any means well known in the art to form polychloro or polybromo substituted dibenzodioxins such as 1,2,3,4,6,7,8,9-octachlorodibenzo-p-dioxin or the polybromo substituted analog thereof, said compounds being useful as flame retardants when admixed with plastics or polymers, thereby imparting the desirable physical characteristics to said plastics or polymers.

It is therefore an object of this invention to provide a novel process for the preparation of dibenzodioxins.

Another object of this invention is to provide a novel catalytic process for reacting a phenol with a palladium halide to form a dibenzodioxin.

In one aspect an embodiment of this invention resides in a process for the preparation of a dibenzo-p-dioxin which comprises reacting a phenol with a palladium halide in the presence of a copper halide catalyst and an oxygen-containing gas in a sodium acetate-acetic acid medium at refluxing conditions and recovering the resultant dibenzo-p-dioxin.

A specific embodiment of this invention is found in a process for the preparation of dibenzo-p-dioxin which comprises reacting phenol with palladium chloride in the presence of copper chloride and air in a sodium acetate-acetic acid medium at refluxing conditions, and recovering the resultant dibenzo-p-dioxin.

Other objects and embodiments will be found in the following further detailed description of the present invention.

As hereinbefore set forth the present invention is concerned with a process for reacting a phenol with a palladium halide in the presence of a catalytic composition of matter and an oxygen-containing gas to form dibenzodioxins. The desired reaction is effected in the presence of a catalyst which comprises a copper halide and an oxygen-containing gas in a sodium acetate-acetic acid medium. Examples of copper halides which may be used as catalysts for the process of this invention include copper chloride and copper bromide in the highest valence state. Oxygen-containing gases which may be used include air and oxygen, the former being preferred due to the lower cost and greater availability.

Phenols which are reacted with the palladium halide will possess the generic formula

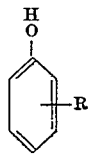

in which R represents one or more or a mixture of non-reactive substituents such as hydrogen, alkyl, alkoxy, aryl, alkaryl, aralkyl, and nitro substituents. Some specific examples of these compounds include phenol, o-cresol, m-cresol, p-cresol, o-ethylphenol, m-ethylphenol, p-ethylphenol, o-propylphenol, m-propylphenol, p-propylphenol, o-isopropylphenol, m-isopropylphenol, p-isopropylphenol, o-butylphenol, m-butylphenol, p-butylphenol, o-methoxyphenol, m-methoxyphenol, p-methoxyphenol, o-ethoxyphenol, m-ethoxyphenol; p-ethoxyphenol, o-propoxyphenol, m-propoxyphenol, p-propoxyphenol, o-butoxyphenol, m-butoxyphenol, p-butoxyphenol, o-phenylphenol, m-phenylphenol, p-phenylphenol, o-benzylphenol, m-benzylphenol, p-benzylphenol, o-tolylphenol, m-tolylphenol, p-tolylphenol, o-nitrophenol, m-nitrophenol, p-nitrophenol, etc. It is to be understood that the aforementioned phenols are only representative of the class of compounds which may be used, and that the present invention is not necessarily limited thereto.

The aforementioned phenols are reacted with a palladium halide such as palladium chloride or palladium bromide to form the desired dibenzodioxin. However, it is also contemplated within the scope of this invention that other noble metal halides of Group VIII of the Periodic Table such as platinum chloride, platinum bromide, ruthenium chloride, ruthenium bromide, rhodium chloride, rhodium bromide, osmium chloride, osmium bromide, iridium chloride, iridium bromide, may also be used, although not necessarily with equivalent results.

The process of this invention may be effected in any suitable manner and may comprise either a batch or continuous type operation. When a batch type operation is used, a quantity of the phenolic compound is placed in an appropriate apparatus such as a flask provided with heat, stirring, and refluxing means. In addition, the flask will also contain a palladium halide and the copper halide catalyst. The reaction is effected in a sodium acetate-acetic acid medium at a temperature approximately the reflux temperature of the acetic acid, that is, from about 118° to 120° C. The reaction is allowed to proceed for a period which will range from about 0.5 up to about 20 hours or more in duration. At the end of this time the heating is discontinued and the reaction mixture is allowed to return to room temperature. The product is filtered to remove the catalyst. The filtrate is then distilled to remove a major portion of the acetic acid, following which a vacuum distillation is performed to remove the remainder of the acetic acid and the unreacted phenolic compound. The bottoms are recovered and further distilled to obtain the desired dibenzodioxin.

It is also contemplated within the scope of this invention that the production of the dibenzodioxins may also be effected in a continuous manner of operation. When such a type of operation is used a reaction zone containing the copper halide catalyst is maintained at the proper operating conditions of temperature and pressure. The phenolic compound and the palladium halide are continuously charged to said reactor through separate means or, if so desired, the two components of the reaction may be admixed prior to entering the said reactor and charged thereto in a single stream. The reaction is effected in a sodium acetate-acetic acid medium which is also charged to the reactor. Upon completion of the desired reaction time the reactor effluent is continuously discharged from the reactor and passed to a separation zone which may comprise a distillation column. In this column the unreacted phenolic compound and acetic acid are separated and recycled to form a portion of the feed stocks for the reaction, while the desired product comprising a dibenzodioxin is recovered.

Examples of dibenzodioxins, and particularly dibenzo-p-dioxins which may be prepared according to the process of this invention will include dibenzo-p-dioxin, 1,6-dimethyldibenzo-p-dioxin, 1,6-diethyldibenzo-p-dioxin, 1,6-dipropyldibenzo-p-dioxin, 1,6-dibutyldibenzo-p-dioxin, 1,4,6,9-tetramethyldibenzo-p-dioxin, 1,4,6,9-tetraethyldibenzo-p-dioxin, 1,4,6,9-tetrapropyldibenzo-p-dioxin, 1,6-dimethoxydibenzo-p-dioxin, 1,6-diethoxydibenzo-p-dioxin, 1,6-dipropoxydibenzo-p-dioxin, 1,4,6,9-tetramethoxydibenzo-p-dioxin, 1,4,6,9-tetraethoxydibenzo-p-dioxin, 1,4,6,9-tetrapropoxydibenzo-p-dioxin, 1,6-diphenyldibenzo-p-dioxin, 1,6-dibenzyldibenzo-p-dioxin, 1,6-dinitrodibenzo-p-dioxin, etc. It is to be understood that the aforementioned dibenzodioxins are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

In this example 128 mmole of phenol, 98 mmole of sodium acetate, 11,3 mmole of palladium chloride, and 336 mmole of a copper chloride catalyst were placed in a flask provided with heating, stirring, and refluxing means. The solution was refluxed in 100 cc. of glacial acetic acid for a period of 10 hours. At the end of this time the product was filtered to remove the copper chloride and sodium acetate. The filtrate was then distilled to remove a major portion of the acetic acid and thereafter distilled to remove the major portion of the phenol which remained. The vacuum bottoms were washed with ethyl either, a Gas-liquid Chromatographic Analysis of the solution indicating the presence of dibenzo-p-dioxin.

EXAMPLE II

In this example 130 mmole of o-cresol, 100 mmole of sodium acetate, 11 mmole of palladium chloride, and 340 mmole of copper chloride are placed in an apparatus similar to that described in Example I. To this mixture is added 100 cc. of glacial acetic acid and the resulting solution is heated to a temperature of 120° C. The reaction mixture is refluxed at this temperature for a period of 10 hours after which heating is discontinued and the mixture allowed to return to room temperature. The work-up of the reaction mixture is similar to that set forth in Example I, that is, the product is filtered and the filtrate is distilled to remove a major portion of the acetic acid and unreacted o-cresol. The bottoms are subjected to analysis by means of a Gas-Liquid Chromatograph, said analysis disclosing the presence of 1,6-dimethyldibenzo-p-dioxin.

EXAMPLE III

A mixture comprising 120 mmole of o-ethylphenol, 100 mmole of sodium acetate, 11 mmole of palladium chloride, and 300 mmole of copper chloride along with 100 cc. of glacial acetic acid is placed in a reflux apparatus which is thereafter heated to a temperature of about 120° C. The mixture is allowed to reflux at this temperature for a period of 10 hours following which the heating is discontinued and the mixture allowed to return to room temperature. The reaction mixture is filtered to remove the catalyst and subjected to fractional distillation under reduced pressure whereby a major portion of the unreacted o-ethylphenol and acetic acid is removed. The bottoms are washed with ethyl either and the solution subjected to a Gas-Liquid Chromatographic Analysis. This analysis will indicate the presence of 1,6-diethyldibenzo-p-dioxin.

EXAMPLE IV

In this example o-methoxyphenol is treated in a manner similar to that herein set forth in the above example by reacting said o-methoxyphenol with palladium chloride in the presence of a copper chloride catalyst in a sodium acetate-glacial acetic acid medium at refluxing conditions for a period of 10 hours. After treating the reaction mixture in a manner similar to that hereinbefore set forth, a Gas-Liquid Chromatographic Analysis of the product will indicate the presence of 1,6-dimethoxydiben-zo-p-dioxin.

EXAMPLE V

In this example 50 mmole of o-nitrophenol, 50 mmole of sodium acetate, 11 mmole of palladium chloride, and 150 mmole of copper chloride along with 50 cc. of glacial acetic acid are placed in a reflux apparatus which is heated to a temperature of about 120° C. The mixture is refluxed for a period of 10 hours accompanied by vigorous stirring of the mixture. Upon completion of the 10 hour period heating is discontinued and the reaction mixture is allowed to return to room temperature. The mixture is filtered and the filtrate is subjected to vacuum distillation to remove a major portion of the unreacted nitrophenol and the glacial acetic acid. Separation using Gas-Liquid Chromatography and identification of the major peaks by means of mass spectrometer and infrared will indicate the pre-sence of 1,6-dinitrodibenzo-p-dioxin.

We claim as our invention:

1. A process for the preparation of a dibenzo-p-dioxin having the formula:

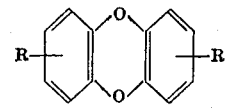

wherein R is selected from the group consisting of hydrogen, lower alkyl, lower alkoxy, phenyl, tolyl, benzyl and nitro, which comprises reacting a phenol having the formula:

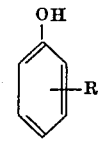

in which R is as defined above, with a palladium halide selected from the group consisting of palladium chloride and palladium bromide in the presence of a gas containing molecular oxygen and a copper halide catalyst selected from the group consisting of copper chloride and copper bromide in a sodium acetate-acetic acid medium at refluxing conditions, and recovering the resultant dibenzo-p-dioxin.

2. The process as set forth in claim 1 in which said palladium halide is palladium chloride.

3. The process as set forth in claim 1 in which said copper halide is copper chloride.

4. The process as set forth in claim 1 in which said oxygen-containing gas is air.

5. The process as set forth in claim 1 in which said oxygen-containing gas is oxygen.

6. The process as set forth in claim 1 in which said phenol is phenol and said dibenzo-p-dioxin is dibenzo-p-dioxin.

7. The process as set forth in claim 1 in which said phenol is o-cresol and said dibenzo-p-dioxin is 1,6-dimethyl-dibenzo-p-dioxin.

8. The process as set forth in claim 1 in which said phenol is o-ethylphenol and said dibenzo-p-dioxin is 1,6-diethyl-dibenzo-p-dioxin.

9. The process as set forth in claim 1 in which said phenol is o-methoxyphenol and said dibenzo-p-dioxin is 1,6-dimethoxydibenzo-p-dioxin.

10. The process as set forth in claim 1 in which said phenol is o-nitrophenol and said dibenzo-p-dioxin is 1,6-dinitrodibenzo-p-dioxin.

* * * * *